US009734744B1

(12) United States Patent
McGie

(10) Patent No.: US 9,734,744 B1
(45) Date of Patent: Aug. 15, 2017

(54) SELF-REACTING MESSAGE BOARD

(71) Applicant: Peter McGie, St. Albert (CA)

(72) Inventor: Peter McGie, St. Albert (CA)

(73) Assignees: Joan Mercior, Edmonton, Alberta (CA); John Strutt, Edmonton, Alberta (CA)

( * ) Notice: Subject to any disclaimer, the term of this patent is extended or adjusted under 35 U.S.C. 154(b) by 0 days.

(21) Appl. No.: 15/188,134

(22) Filed: Jun. 21, 2016

Related U.S. Application Data

(60) Provisional application No. 62/328,251, filed on Apr. 27, 2016.

(51) Int. Cl.
*B60Q 1/00* (2006.01)
*B60Q 1/50* (2006.01)
(Continued)

(52) U.S. Cl.
CPC .............. *G09G 3/14* (2013.01); *B60Q 1/26* (2013.01); *B60Q 1/2611* (2013.01); *B60Q 9/006* (2013.01); *B60Q 9/007* (2013.01); *B60Q 9/008* (2013.01); *G01S 19/01* (2013.01); *G08G 1/0965* (2013.01); *G08G 1/096741* (2013.01); *G09F 13/22* (2013.01); *G09F 21/04* (2013.01); *G09F 21/048* (2013.01); *B60Q 1/50* (2013.01); *B60Q 1/503* (2013.01); *B60Q 2900/30* (2013.01); *G01S 13/87* (2013.01); *G01S 13/931* (2013.01);
(Continued)

(58) Field of Classification Search
CPC ............... G01S 13/87; G01S 13/931; G01S 2013/9325; G01S 2013/936; G01S 15/931; G08G 1/0965; G08G 1/096741; G08G 2380/06; G09F 21/04; G09F 21/048; B60Q 1/26; B60Q 1/2611; B60Q 1/50; B60Q 1/503; B60Q 2900/30; B60Q 9/006; B60Q 9/007; B60Q 9/008
See application file for complete search history.

(56) References Cited

U.S. PATENT DOCUMENTS 5,087,918 A * 2/1992 May ................ G01S 13/931 340/435
5,162,696 A * 11/1992 Goodrich ............ G09F 9/33 257/E25.02

(Continued)

*Primary Examiner* — Michael J Eurice

(57) ABSTRACT

Disclosed is a digital sign system and method of use thereof. The system includes a digital sign having a controller board having a microcontroller, a temperature sensor communicably coupled to fans or a cooling/heating unit, an ambient light sensor, a GPS unit, a radar, a communication module, and a power source, wherein the controller board is in communication with an LED panel or another display module for digitally outputting messages, further wherein the digital sign is mounted on a pilot truck to allow the pilot truck to relay messages to a transport truck and oncoming vehicles. The digital sign is in communication with a second GPS unit disposed on the transport truck so as to track the real-time location of the truck. The digital sign measures the distance between a transport and the digital pilot truck sign and displays the relative distances between the two on the digital message board. In operation, the digital sign is configured to automatically adjust its brightness so as to optimize its visibility while reducing glare to other drivers on the road.

14 Claims, 5 Drawing Sheets

(51) Int. Cl.
*B60Q 1/26* (2006.01)
*G09G 3/14* (2006.01)
*G09F 13/22* (2006.01)
*G09F 21/04* (2006.01)
*G01S 19/01* (2010.01)
*B60Q 9/00* (2006.01)
*G08G 1/0967* (2006.01)
*G08G 1/0965* (2006.01)
*G01S 15/93* (2006.01)
*G01S 13/93* (2006.01)
*G01S 13/87* (2006.01)

(52) U.S. Cl.
CPC ....... *G01S 15/931* (2013.01); *G01S 2013/936* (2013.01); *G01S 2013/9325* (2013.01); *G09F 2013/222* (2013.01); *G09G 2320/0626* (2013.01); *G09G 2354/00* (2013.01); *G09G 2360/144* (2013.01); *G09G 2380/06* (2013.01); *G09G 2380/10* (2013.01)

(56) References Cited

U.S. PATENT DOCUMENTS

| | | | | |
|---|---|---|---|---|
| 6,058,718 A * | 5/2000 | Forsberg | C02F 9/005 62/125 |
| 6,505,774 B1 * | 1/2003 | Fulcher | G06Q 30/0284 235/379 |
| 6,894,608 B1 * | 5/2005 | Gunderson | B60Q 1/525 340/425.5 |
| 7,696,865 B1 * | 4/2010 | Robinson | B60Q 1/503 340/472 |
| 7,826,945 B2 | 11/2010 | Zhang | |
| 2002/0005778 A1 * | 1/2002 | Breed | B60Q 9/008 340/435 |
| 2002/0105432 A1 * | 8/2002 | Pederson | B60Q 1/2611 340/815.45 |
| 2002/0133285 A1 * | 9/2002 | Hirasago | B60K 31/0008 701/96 |
| 2003/0034934 A1 * | 2/2003 | Brewer | B60Q 1/503 345/1.1 |
| 2004/0105264 A1 * | 6/2004 | Spero | B60Q 1/04 362/276 |
| 2004/0201483 A1 * | 10/2004 | Stam | B60Q 1/1423 340/600 |
| 2006/0026017 A1 * | 2/2006 | Walker | H04L 63/302 701/31.4 |
| 2006/0059745 A1 * | 3/2006 | Maqui | G09F 21/04 40/591 |
| 2007/0005206 A1 * | 1/2007 | Zhang | G06F 3/16 701/36 |
| 2007/0256339 A1 * | 11/2007 | Fryer | G01J 1/4204 40/442 |
| 2008/0220760 A1 | 9/2008 | Ullah | |
| 2008/0236007 A1 * | 10/2008 | Au | B60Q 1/2611 40/592 |
| 2008/0290803 A1 * | 11/2008 | Santo | G09G 3/3413 315/151 |
| 2008/0316153 A1 * | 12/2008 | Yuen | G09F 9/33 345/82 |
| 2009/0150242 A1 * | 6/2009 | Del Cogliano | G06Q 30/0265 705/14.62 |
| 2010/0253493 A1 * | 10/2010 | Szczerba | G01S 13/723 340/435 |
| 2010/0253539 A1 * | 10/2010 | Seder | G01S 13/723 340/903 |
| 2011/0013109 A1 * | 1/2011 | Bryan | G09F 7/12 349/58 |
| 2011/0067059 A1 | 3/2011 | Johnston | |
| 2011/0069050 A1 * | 3/2011 | Sirmon | G09F 9/33 345/207 |
| 2011/0080421 A1 * | 4/2011 | Capener | G09G 5/10 345/589 |
| 2011/0106329 A1 * | 5/2011 | Donnelly | B60L 3/12 700/291 |
| 2011/0130915 A1 * | 6/2011 | Wright | G01M 17/007 701/29.6 |
| 2011/0199254 A1 * | 8/2011 | Bishop | G01S 13/89 342/179 |
| 2012/0013459 A1 * | 1/2012 | Giangrande | B60Q 1/44 340/468 |
| 2012/0025964 A1 * | 2/2012 | Beggs | B60Q 1/2673 340/435 |
| 2012/0062743 A1 * | 3/2012 | Lynam | B60Q 9/005 348/148 |
| 2012/0303458 A1 * | 11/2012 | Schuler, Jr. | G09F 27/005 705/14.63 |
| 2013/0258044 A1 * | 10/2013 | Betts-Lacroix | H04N 13/0242 348/36 |
| 2013/0258688 A1 * | 10/2013 | Kalapodas | B60Q 1/085 362/465 |
| 2014/0149216 A1 * | 5/2014 | McGie | G06Q 30/0257 705/14.55 |
| 2014/0159993 A1 * | 6/2014 | McGie | G06F 3/1438 345/2.3 |
| 2014/0210646 A1 * | 7/2014 | Subramanya | B61L 29/28 340/928 |
| 2014/0304080 A1 * | 10/2014 | Yilmaz | G09F 21/04 705/14.63 |
| 2014/0338237 A1 * | 11/2014 | Chu | G09F 9/30 40/452 |
| 2015/0061895 A1 * | 3/2015 | Ricci | H04W 4/22 340/902 |
| 2015/0120089 A1 * | 4/2015 | Peel | B60T 7/16 701/2 |
| 2015/0276187 A1 * | 10/2015 | Shoemake | F21V 21/00 362/235 |
| 2016/0231746 A1 * | 8/2016 | Hazelton | G05D 1/0212 |

* cited by examiner

SELF-REACTING MESSAGE BOARD

CROSS-REFERENCE TO RELATED APPLICATIONS

This application claims the benefit of U.S. Provisional Patent Application No. 62/328,251, filed Apr. 27, 2016, which is hereby incorporated by reference in its entirety.

FIELD OF THE INVENTION

The present invention relates generally to digital message boards. More particularly, the present invention is directed to message board systems for pilot freight services.

BACKGROUND OF THE INVENTION

Pilot trucks for freight services typically comprise signs for warning the oncoming traffic of an oversize load trailing a pilot truck. Some of the existing signs comprise simple banners, but these banners are difficult to see in the dark or in inclement weather. Other existing signs comprise digital signs (i.e., with illumination means). Conventional digital signs for pilot trucks are generally visible from approximately 45 meters away, although the visibility can be greatly increased when the brightness setting of these digital signs is at its maximum setting. However, the brightness of the sign can cause glare or distraction, which can be dangerously blinding to the drivers of the oncoming traffic and cause traffic accidents. In this regard, the invention described herein addresses this problem.

SUMMARY OF THE INVENTION

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as to prelude to the more detailed description that is disclosed later.

Some embodiments of the present invention include, for example, devices, systems, and methods of providing a digital message board that automatically reacts to the oncoming traffic in order to increase visibility of warning messages and traffic signs while reducing glare and distractions on the road.

Some embodiments of the present system include a system including a digital sign comprising a controller board having a microcontroller, a temperature sensor communicably coupled to fans or a cooling/heating unit, an ambient light sensor, a GPS unit, a radar, a communication module, and a power source, wherein the controller board is in communication with an LED panel or another display module for digitally outputting messages, further wherein the digital sign is mounted on a pilot truck to allow the pilot truck to relay messages to a transport truck and oncoming vehicles on the road.

Some embodiments of the digital sign are operated via an electronic device (e.g., a computer system), which is communicably coupled thereto via wireless means. The electronic device comprises a memory unit having instructions stored thereon, wherein the instructions can be executed via a processing unit, causing the electronic device to operate the digital sign, for example, in order to upload messages to be displayed on the LED panel, to control brightness settings, and the like.

Additionally, the system comprises a load that is carried by the transport truck, the load further comprising one or more sensors that is communicably coupled to the digital sign and/or the electronic device. Without limitation, the sensors may comprise various environmental sensors such as a GPS unit, a temperature sensor, a light sensor, a still photo or video camera, an audio sensor (e.g., a microphone), a velocity sensor, a gyroscope, an accelerometer, a speed sensor, and a compass, depending upon embodiment. The sensors may be removably attached to the load such that one sensor can be re-used with multiple loads and the sensors can be retroactively fitted to various types of loads.

Each of the pilot truck and the transport truck comprises a GPS unit for providing accurate, real-time location of each of the vehicles. The real-time location of the vehicles can be used for determining the brightness of the LED panel when the pilot truck is relaying messages via the LED panel to the transport truck. Additionally, the real-time location of the vehicles can be used to calculate the distance between the pilot truck and the transport truck to warn the oncoming traffic of how far away the transport truck is.

The LED panel of the pilot truck is further configured to transmit messages to vehicles of the oncoming traffic. Without limitation, the pilot truck can warn the oncoming vehicles of a trailing oversize load, a wide load, and an emergency vehicle, among other types of messages. The brightness of the LED panel can be automatically adjusted depending on the distance of the oncoming vehicles to prevent the LED panel from blinding the drivers of the oncoming vehicles, while providing sufficient brightness to the oncoming vehicles in the distance.

BRIEF DESCRIPTION OF THE DRAWINGS

The above and other objects and advantages of the present invention will be apparent upon consideration of the following detailed description, taken in conjunction with the accompanying exemplary drawings, in which like reference characters refer to like parts throughout, and in which.

DETAILED DESCRIPTION OF THE INVENTION

Figure 1:
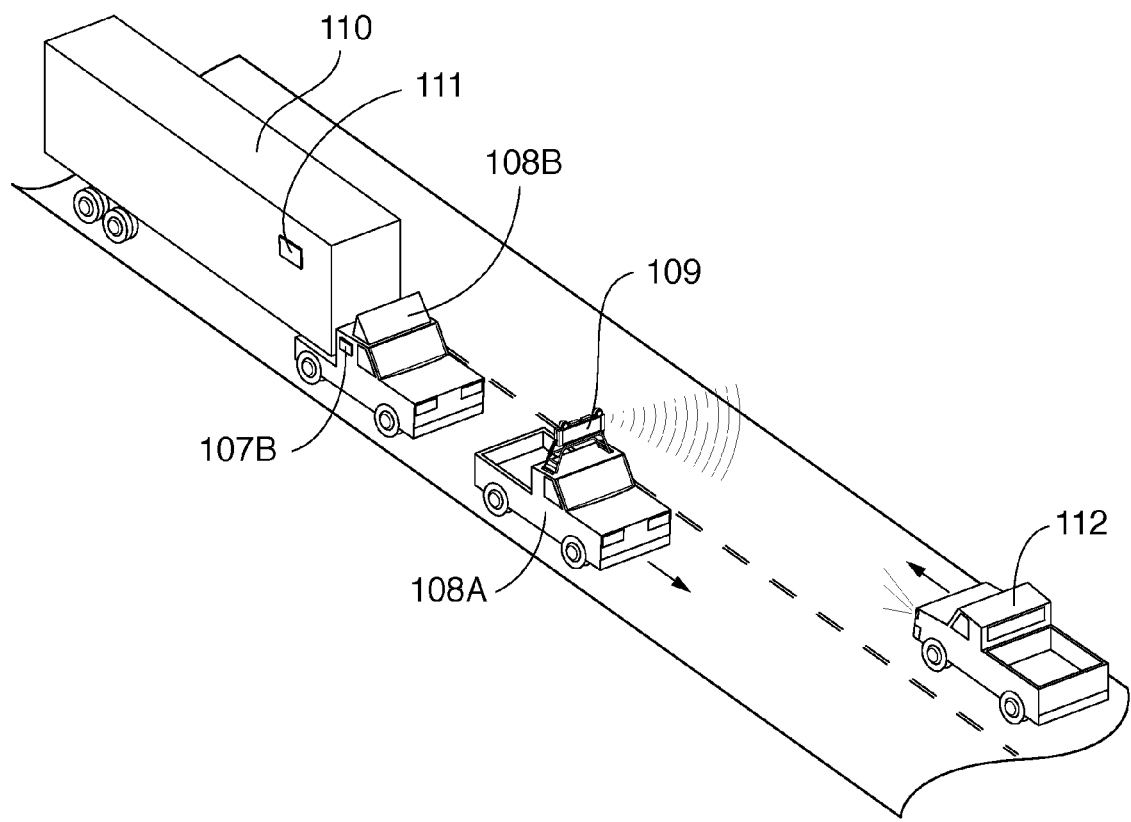
FIG. 1 depicts a diagram of the present system in operation.

The present invention is directed towards an automatic digital sign system and a method of use thereof. For purposes of clarity, and not by way of limitation, illustrative views of the present system and method are described with references made to the above-identified figures. Various modifications obvious to one skilled in the art are deemed to be within the spirit and scope of the present invention.

As used in this application, the terms "component," "module," "system," "interface," or the like are generally intended to refer to a computer-related entity, either hardware or a combination of hardware and software. For example, a component can be, but is not limited to being, a process running on a processor, an object, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

It is to be appreciated that determinations or inferences referenced throughout the subject specification can be practiced through the use of artificial intelligence techniques. In this regard, some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Discussions herein utilizing terms such as, for example, "processing," "computing," "calculating," "determining," "establishing," "identifying," "analyzing," "checking," or the like, may refer to operations(s) and/or process(es) of a computer, a computing platform, a computing system, or other electronic computing device, that manipulate and/or transfer data represented as physical (e.g., electronic) quantities within the computer's registers and/or memories into other data similarly represented as physical quantities within the computer's registers and/or memories or other information storage medium that may store instructions to perform operations and/or processes.

Some embodiments of the present invention may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a personal computer (PC), a desktop computer, a mobile computer, a laptop, a tablet computer, a server computer, a handheld device, a personal digital assistant (PDA), a wireless communication device, a smart phone, a non-portable device, a wireless access point (AP), a wired or wireless router, a wired or wireless modem, a wired or wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), or networks operating in accordance with existing and/or future versions and/or derivatives of long term evolution (LTE), a device which incorporates a global positioning system (GPS) receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, or the like.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or." Additionally, the articles "a" and "an" as used in this application and the appended claims should generally be construed to mean "one or more" or "at least one" unless specified otherwise or clear from context to be directed to a singular form.

Figure 2:
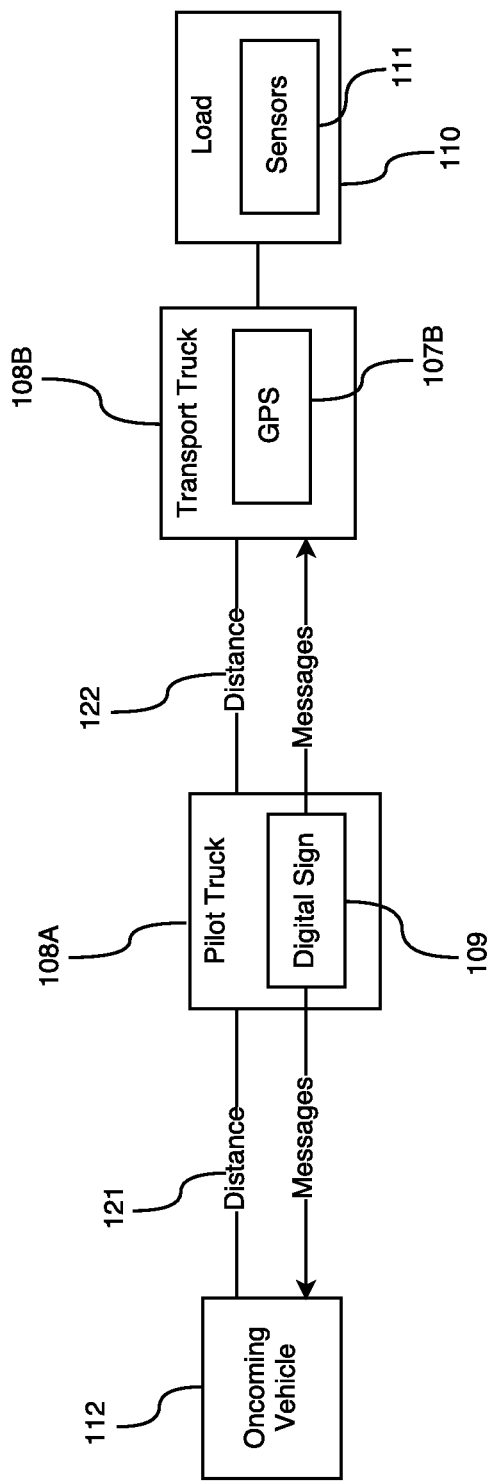
FIG. 2 depicts a high-level block diagram of the present system in accordance with some embodiments of the present invention.
Figure 3:
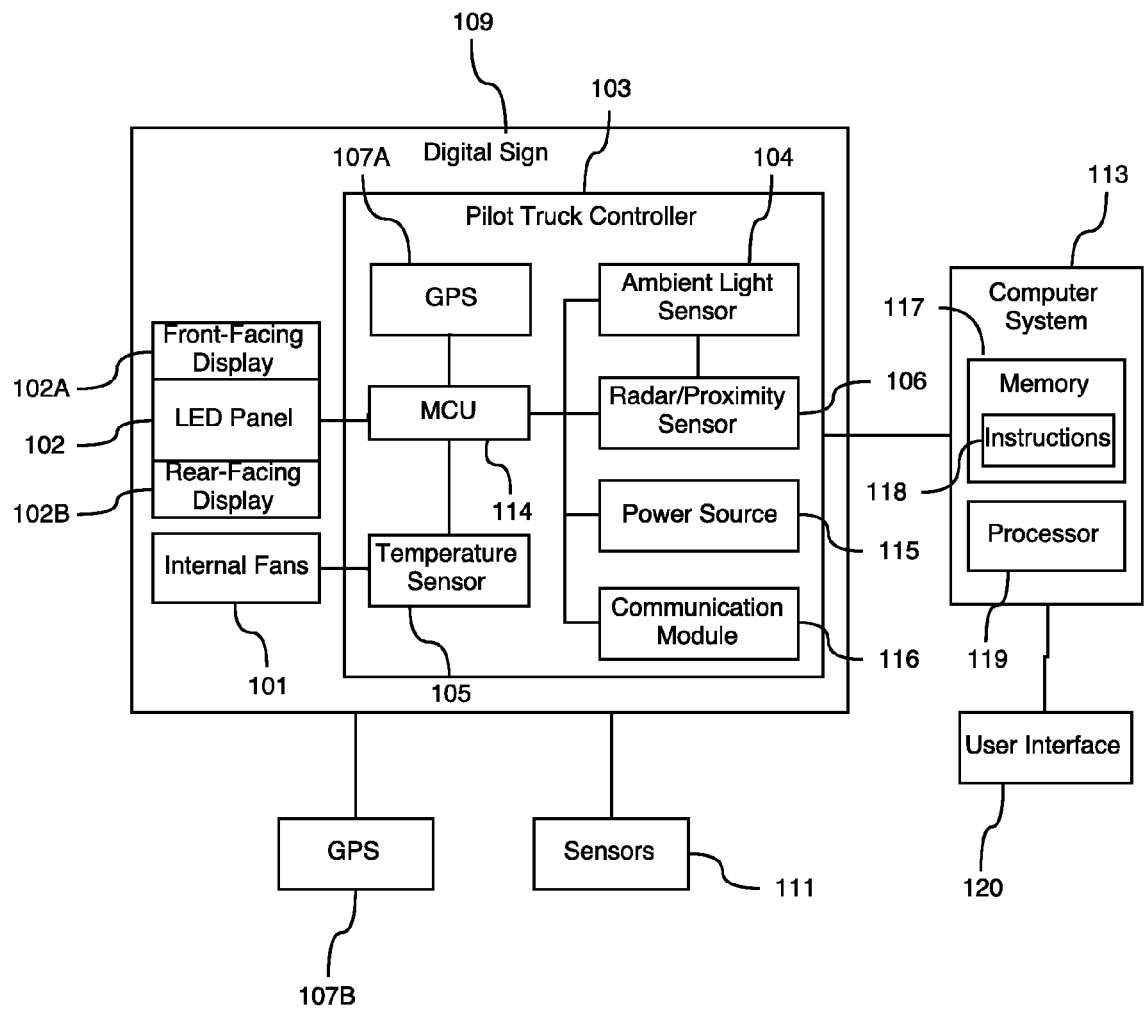
FIG. 3 depicts a detailed diagram of the controller of the present system.

Referring now to FIGS. 1 through 3, there are shown various block diagrams of the present system. Some embodiments of the present system include a digital sign 109 comprising a first GPS unit 107A, wherein the digital sign 109 is in communication with a second GPS unit 107B and/or one or more sensors 111, further wherein the digital sign 109 is mounted on a pilot truck 108A, the second GPS unit 107B is mounted on a transport truck 108B, and the sensors 111 are mounted on a load 110 that is hauled by the transport truck 108B.

The digital sign 109 comprises a controller board 103, which includes a microcontroller (MCU) 114 or another suitable processing/controller unit that is communicably coupled to a temperature sensor 105, an ambient light sensor 104, a first GPS unit 107A, a radar/proximity sensor 106, a communication module 116, and a power source 115 (e.g., batteries), wherein the MCU 114 is also electrically connected to an LED panel 102 or another display unit for displaying messages digitally. It is contemplated that the digital sign 109 comprises a housing member with a defined interior volume for enclosing the foregoing elements therein, while allowing the LED panel 102 to be visible from the exterior of the housing member.

The LED panel 102 of the pilot truck 108A may comprise a front-facing display 102A and a rear-facing 102B display so that the panel 102 can display different messages to the oncoming vehicles 112 and the transport truck 108B, respectively. For example, the front-facing display 102A can warn the oncoming vehicle 112 of a wide load, and the rear-facing display 102B can warn the transport truck 108B of, for example, the road conditions ahead. Alternatively, both the front-facing display 102A and the rear-facing display 102B can be configured to display the same or different texts, pictures, numbers, symbols, or the like.

The temperature sensor 105 is further connected to internal fans 101 disposed in the interior volume of the housing, wherein the fans 101 are configured to automatically activate, via the MCU 114, when the temperature sensor 105 detects that the temperature is below a predetermined threshold. In this way, the fans 101 can blow hot air through perforations disposed on the housing member to warm up, for example, the Lexan™ that is covering the viewing surface of the LED panel 102 and melt any ice or snow that has accumulated. Alternatively, the fans 101 may be configured to automatically activate to cool the interior of the sign 109 to prevent overheating when the temperature is above a predetermined threshold. In some embodiments, the fans 101 can comprise heating and/or cooling units.

It is contemplated that the fans 101 are also configured to automatically deactivate when the temperature is within a predetermined range of temperatures, for example, at ambient temperatures or at ideal temperatures. The predetermined temperatures noted herein may be pre-programmed (i.e., based on factory settings) or adjustable (i.e., based on consumer- or user-established preferences) via another electronic device 113 (e.g., a computer, a smart phone).

Some embodiments of the present system further comprise a radar/proximity sensor 106, wherein the radar/proximity sensor 106 is configured to detect an oncoming vehicle 112 and trigger the LED panel 102 to dim when the oncoming vehicle 112 is within a predetermined distance 121 of the front (i.e., the traveling direction) of the pilot truck 108A. As used herein, the "predetermined distance" is a distance that would not cause glare for other drivers.

The radar/proximity sensor 106 is further configured to determine whether the oncoming vehicle 112 has passed the pilot truck 108A, or is no longer in the traveling direction of the pilot truck 108A. In this way, the radar/proximity sensor 106 can trigger the LED panel 102 to return to its starting brightness setting when the oncoming vehicle 112 is no longer within the predetermined distance 121 of the front of the pilot truck 108A.

The radar/proximity sensor 106 can be used in conjunction with the ambient light sensors 104. The ambient light sensors 104 are configured to approximate the human eye response to light under a variety of lighting conditions and lighting environments (e.g., from low-light to bright sunlight). In this way, the ambient light sensors 104 are configured to manage or control the brightness of the LED panel 102 when an oncoming vehicle 112 is approaching. More specifically, the ambient light sensors 104 can trigger the LED panel 102 to dim or adjust brightness when the radar/proximity sensor 106 determines that an oncoming vehicle 112 is within a predetermined distance 121 of the pilot truck 108A (i.e., in the pilot truck's 108A traveling direction) to prevent blinding the driver of the oncoming vehicle 112. When the oncoming vehicle 112 has passed the pilot truck 108A, the ambient light sensors 104 are configured to trigger the LED panel 102 to return to its original brightness to allow other drivers in the oncoming traffic to easily view the sign from a long distance.

Some embodiments of the system further comprise the communication module 116, wherein the communication module 116 is configured to establish wireless communication between the digital sign 109 and at least one input terminal, such as a remote electronic device (e.g., a computer system 113). It is noted that the electronic device comprises various types of computer systems 113, including a smart phone, a tablet computer, a laptop, a desktop computer, a personal digital assistant (PDA), an e-reader, and the like.

The computer system 113 comprises a memory unit 117 having instructions 118 stored thereon, wherein the instructions 118 can be executed by a processor 119, causing the computer system 113 to operate the digital sign 109, for example, to upload and update messages to be displayed on the LED panel, to control brightness settings, to set predetermined temperatures, to set predetermined distance ranges, and the like, for example, via a user interface 120. It is contemplated that the computer system 113 and the digital sign 109 are configured to pair with each other. In some embodiments, one computer system 113 can be paired with a plurality of digital signs 109.

The present system further includes a transport truck 108B comprising a second GPS unit 107B, which is in communication with the digital sign 109. The transport truck 108B further comprises a load 110 being transported thereon. The load 110 comprises one or more sensors 111 thereon, wherein the sensors 111 comprise temperature sensor, ambient light sensor, and other types of sensors. For instance, sensors 111 may further comprise various types of environmental sensors such as a GPS unit, a still photo or video camera, an audio sensor (e.g., a microphone), a velocity sensor, a gyroscope, an accelerometer, a speed sensor, and a compass, depending upon embodiment. The sensors 111 are communicably coupled to the digital sign 109 and/or the computer system 113 so as to inform one or more users of the status of the load 110.

The GPS unit 107A, 107B can be used for providing accurate, real-time location of each of the vehicles (i.e., the pilot truck 108A and the transport truck 108B) while on the road. For instance, the location of the pilot truck 108A is communicated to the transport truck 108B, and the location of the transport truck 108B is communicated to the pilot truck 108A. The locations of the vehicles are used for determining the required brightness of the LED panel 102 when the panel 102 is used to relay messages from the pilot truck 108A to the transport truck 108B. More specifically, the locations of the vehicles are used to calculate the distance 122 between the pilot truck 108A and the transport truck 108B; and if the distance 122 is less than a predetermined distance, then the LED panel 102 (i.e., the rear-facing display 102B) is configured to dim or adjust in brightness, for example, as specified by the ambient light sensor 104.

Additionally, the calculated distance 122 between the pilot truck 108A and the transport truck 108B can be displayed on the LED panel 102 (i.e., the front-facing display 102A) to inform the oncoming traffic of the distance 122 of the transport truck 108B trailing behind the pilot truck 108A. Moreover, the real-time location of the vehicles can be used to inform the driver of the vehicles of the whereabouts of each vehicle.

Figure 4A:
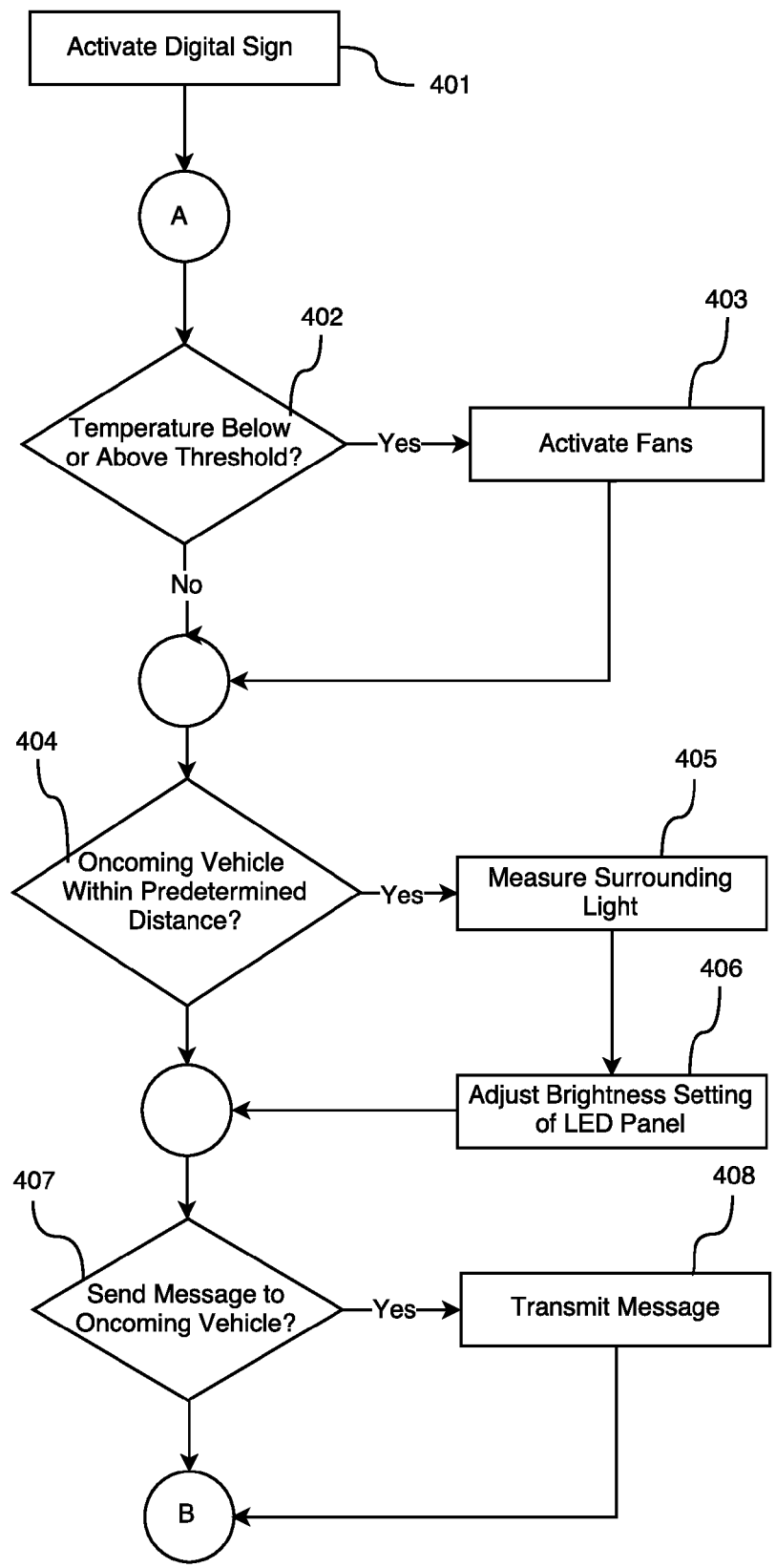
FIGS. 4A and 4B show exemplary method steps of the present invention.
Figure 4B:
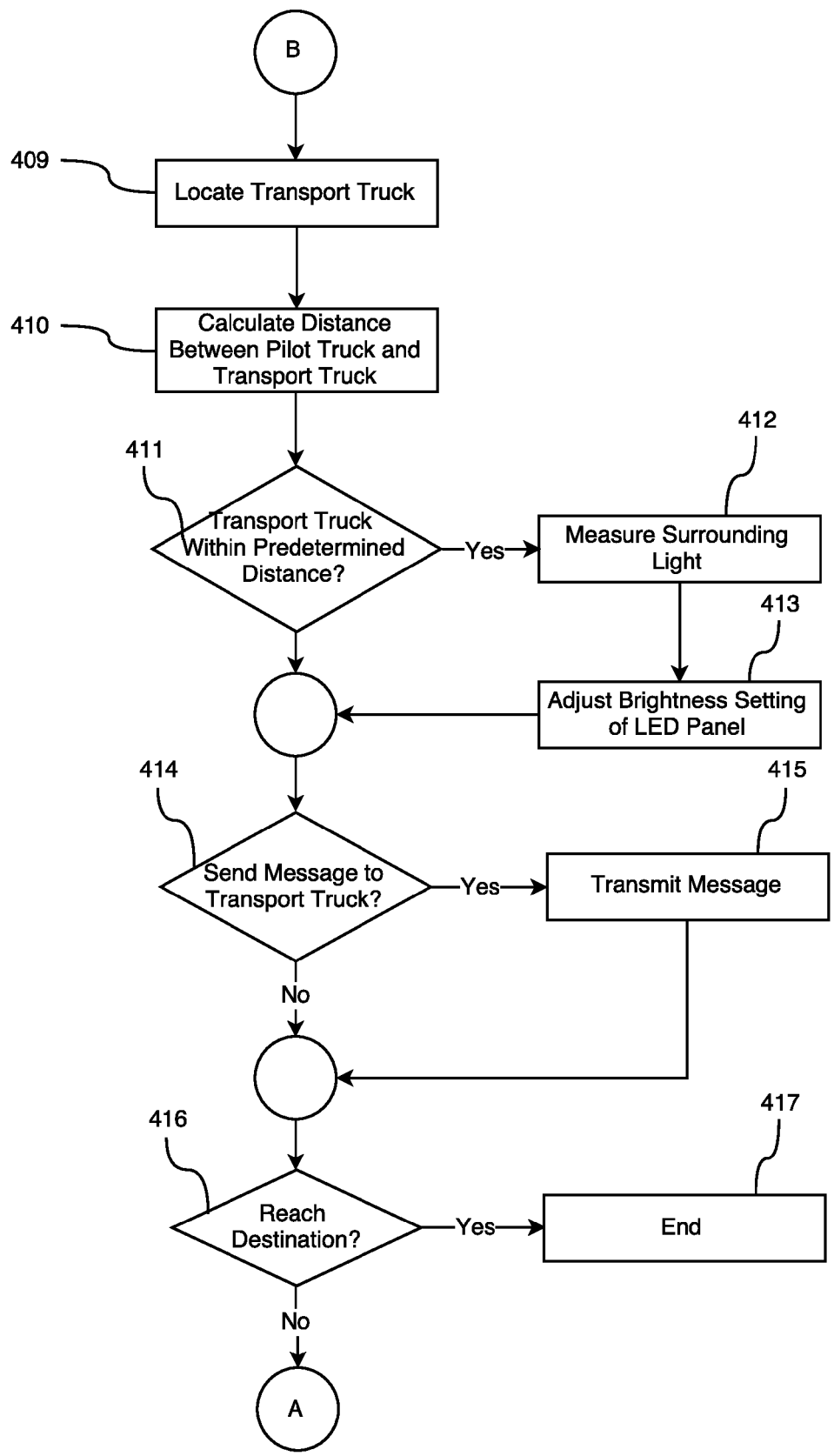
Figure 1:
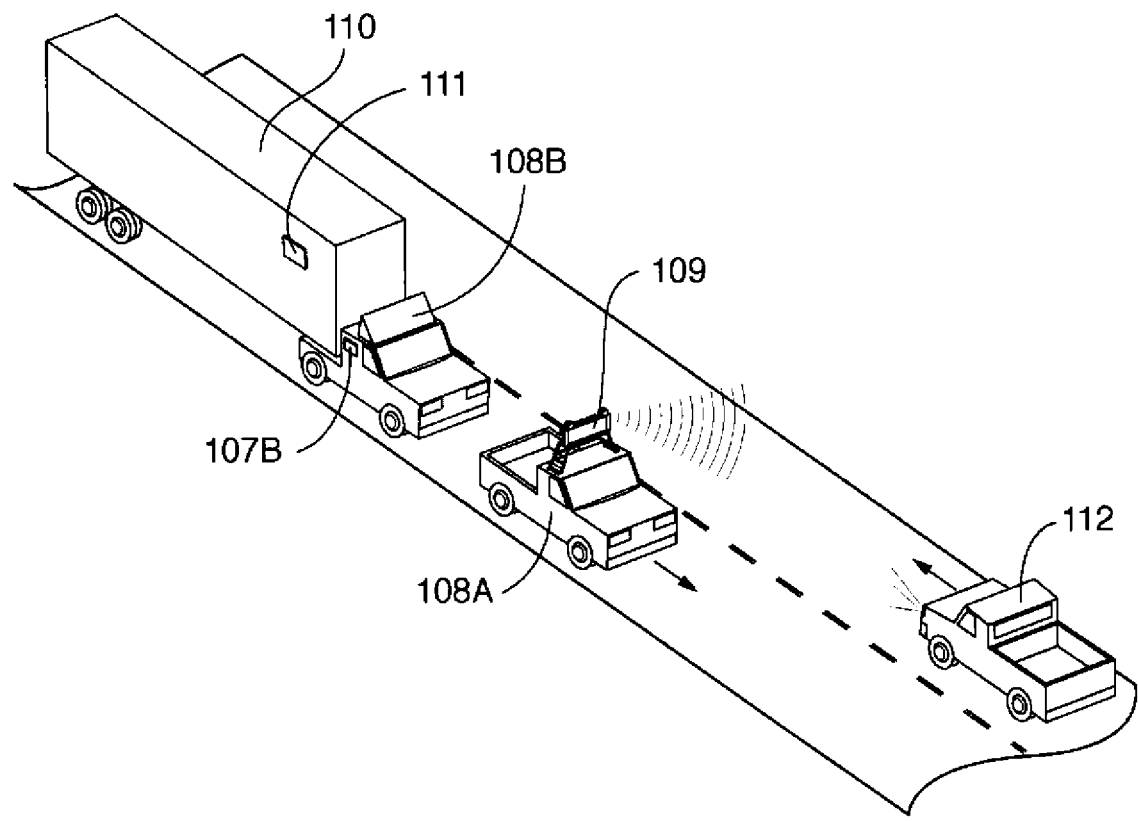
Figure 3:
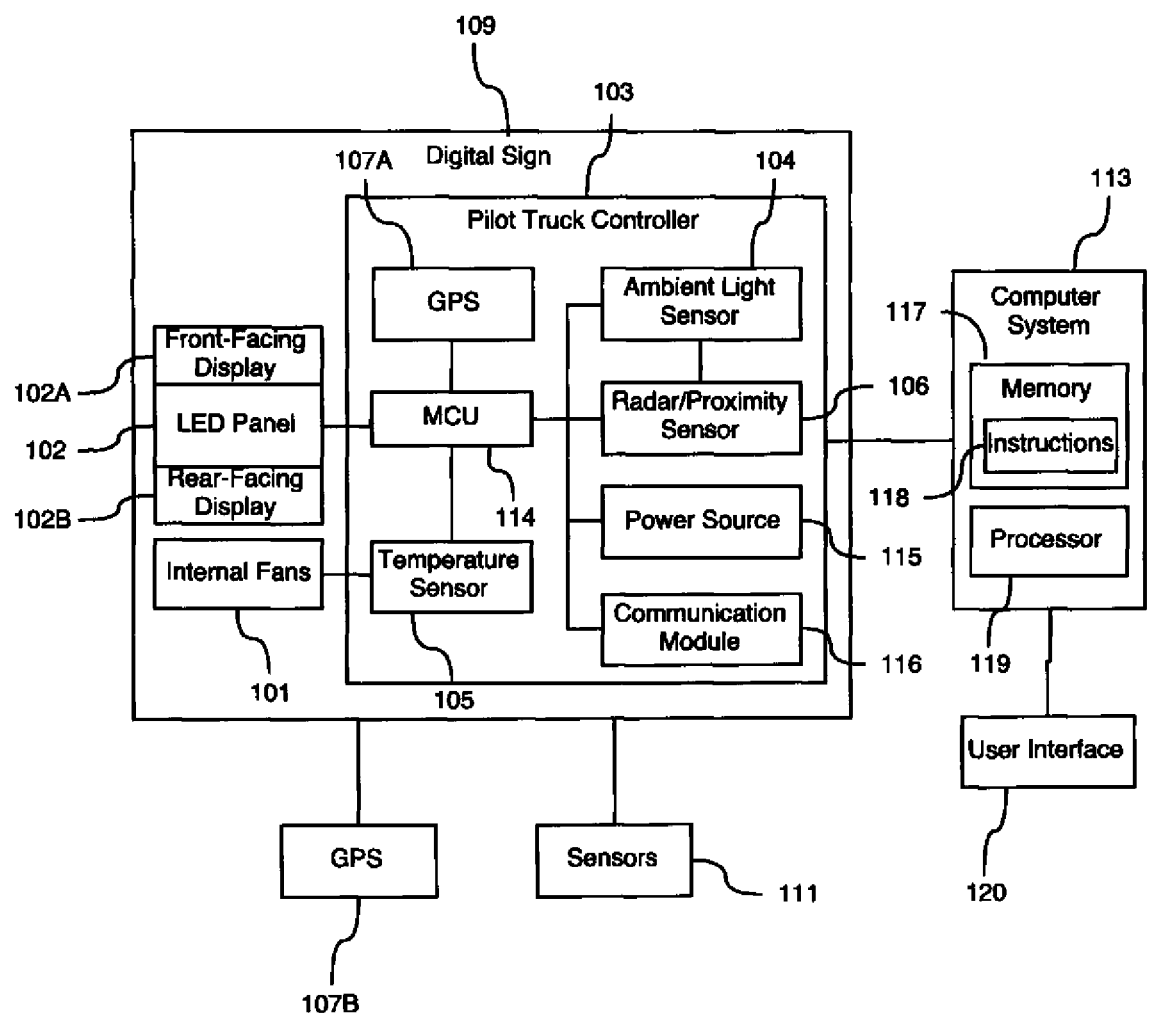
Figure 4A:
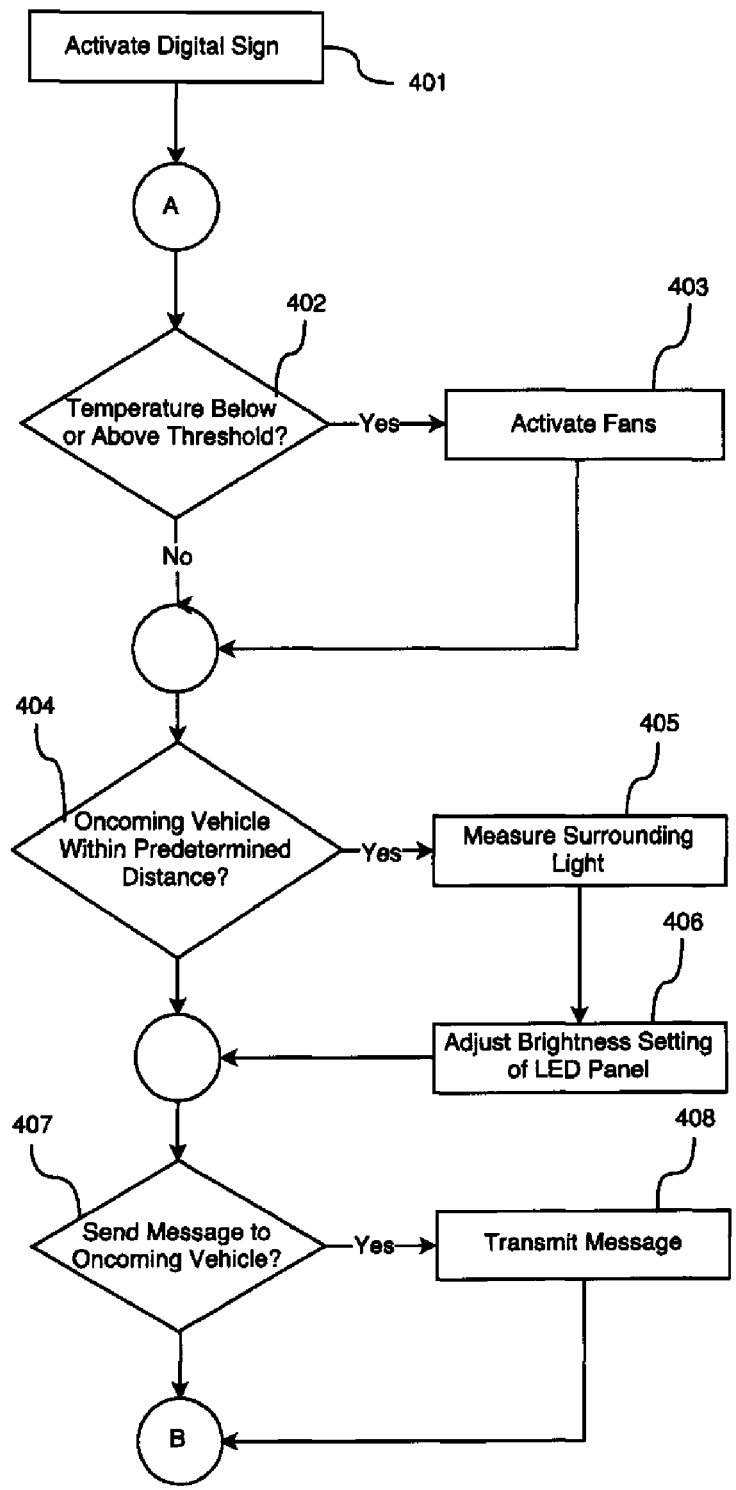
Figure 4B:
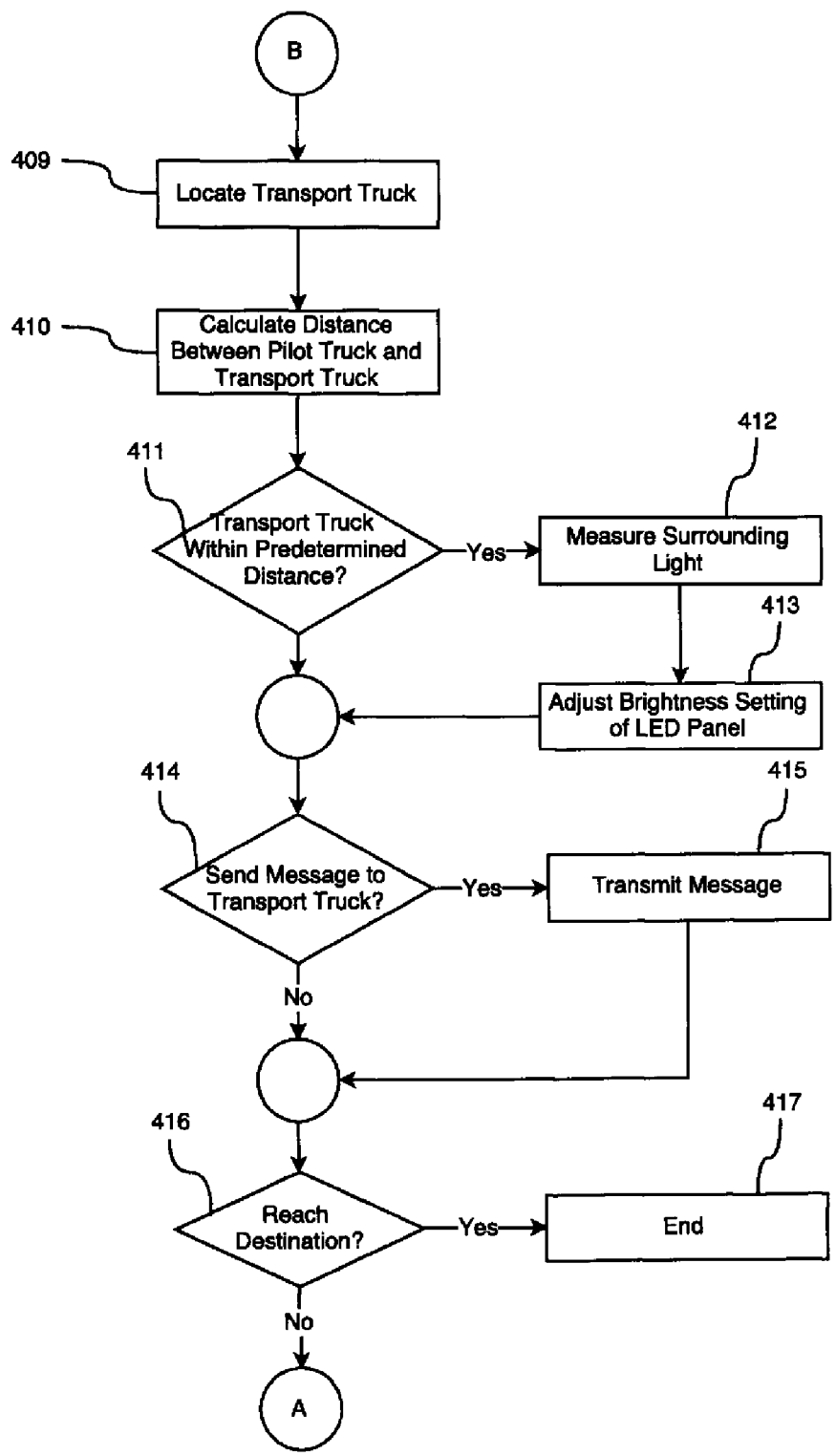

Reference is now made to FIGS. 4A and 4B, which shows exemplary method steps of the present invention in operation. In some embodiments, one or more operations of FIGS. 4A and 4B may be performed by one or more elements of the present system as depicted in FIGS. 1 through 3, for example, the controller board 103 (FIG. 3) and the LED panel 102 (FIG. 3), among other components.

To start 401, the digital sign 109 is activated and optionally mounted on a pilot truck 108A (FIG. 1). As indicated in block 402, the present method comprises the step of determining whether the exterior temperature is below or above threshold via the temperature sensor 105 (FIG. 3). If the measured temperature is below or above a predetermined range of temperatures or threshold, the temperature sensor 105 (FIG. 3) triggers the fans 101 (FIG. 3) to activate via the MCU 114 (FIG. 3), as indicated in block 403. It is contemplated that the temperature sensor 105 (FIG. 3) is configured to continuously measure the temperature so as to automatically deactivate the fans 101 (FIG. 3) via the MCU 114 (FIG. 3) when the temperature is within the predetermined range of temperatures.

As indicated in block 404, the radar/proximity sensor 106 (FIG. 3) determines whether an oncoming vehicle 112 (FIG. 1) (i.e., traveling in the opposite direction as the pilot truck 108A (FIG. 1) and the transport truck 108B (FIG. 1)) is within a predetermined distance 121 (FIG. 2) away from the pilot truck 108A (FIG. 1). If the oncoming vehicle is within a predetermined distance 121 (FIG. 2) of the pilot truck 108A (FIG. 1), the ambient light sensor 104 (FIG. 3) measures the surrounding light to determine the appropriate brightness level of the front-facing display 102A (FIG. 3) of the LED panel 102 (FIG. 3), as indicated in block 405. In one embodiment, the brightness level of the front-facing display 102A (FIG. 3) of the LED panel 102 (FIG. 3) is reduced, dimmed, or otherwise adjusted 406. In this way, the brightness setting of the LED panel 102 (FIG. 3) is managed or controlled by the ambient light sensor 104 (FIG. 3).

If the oncoming vehicle 112 (FIG. 1) is not within a predetermined distance 121 (FIG. 2) or if the oncoming vehicle 112 is no longer in front of the pilot truck 108A (FIG. 1), the brightness level of the LED panel 102 (FIG. 3) is maintained or increased back to the original or starting brightness level. It is contemplated that in some embodiments, the brightness level can be automatically adjusted via the ambient light sensor 104 (FIG. 3) based on the amount light detected even when there is no oncoming vehicle 112 (FIG. 1).

As indicated in block 407, the digital sign 109 (FIG. 3) can display messages, via the front-facing display 102A (FIG. 3) of the LED panel 102 (FIG. 3), to oncoming vehicles. If a user wishes to transmit a message, the message may be manually input via a separate user device 113 (FIG. 3) (e.g., a handheld electronic device, mobile phone, tablet computer, etc.) and transmitted. Alternatively, the user can select a message from a list of preloaded messages and then transmit the message 408. In some embodiments, the user can program the MCU 114 (FIG. 3) so as to display certain messages at specific times or alternate multiple messages. In this regard, the MCU 114 (FIG. 3) may be configured to store one or more messages therein.

As indicated in block 409, the transport truck 108B (FIG. 1) is located via the second GPS unit 107B (FIG. 3). The real-time location of the transport truck 108B (FIG. 1) is used to calculate the distance 122 (FIG. 2) between the pilot truck 108A (FIG. 1) and the transport truck 108B (FIG. 1), as indicated in block 410. If the transport truck 108B (FIG. 1) is within a predetermined distance 122 (FIG. 2) away from the pilot truck 108A (FIG. 1), as indicated in block 411, the brightness level of the rear-facing display 102B (FIG. 3) of the LED panel 102 (FIG. 3) is adjusted. Optionally, the ambient light sensor 104 (FIG. 3) can measure the surrounding light to determine the appropriate brightness level of the rear-facing display 102B (FIG. 3) of the LED panel 102 (FIG. 3), as indicated in block 412.

As indicated in block 414, the digital sign 109 (FIG. 3) of the pilot truck 108A (FIG. 1) can display messages, via the rear-facing display 102B (FIG. 3) of the LED panel 102 (FIG. 3) to the transport truck 108B (FIG. 1). As described above, the message may be manually input via a separate user device 113 (FIG. 3) (e.g., a handheld electronic device, mobile phone, tablet computer, etc.) and transmitted. Alternatively, the user can select a message from a list of preloaded messages and then transmit the message 415.

As indicated in block 416, the GPS location of the pilot truck 108A (FIG. 1) and the transport truck 108B (FIG. 1) can be used to determine whether the vehicles have reached the destination. When the vehicles have reached the destination, the digital sign 109 (FIG. 3) can automatically terminate operation 417.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A system for displaying messages, comprising:
   a digital sign comprising a controller board having a microprocessor, a processor, an ambient light sensor, an LED panel, and a power source, wherein said digital sign is mounted on a pilot truck, further wherein said LED panel comprises a front-facing display visible to an oncoming vehicle and a rear-facing display visible to a transport truck trailing said pilot truck;
   said ambient light sensor configured to measure surrounding light and adjust a brightness level of said front-facing display of said LED panel when said pilot truck is within a first predetermined distance of said oncoming vehicle and adjust a brightness level of said rear-facing display of said LED panel when said pilot truck is within a second predetermined distance of said transport truck.

2. The system of claim 1, wherein said controller board further comprises a temperature sensor communicably coupled to internal fans, further wherein said temperature sensor is configured to activate said internal fans when said temperature sensor determines that exterior temperature is above or below a predetermined range of temperatures.

3. The system of claim 1, wherein said transport truck comprises a load, further wherein said load comprises one or more sensors communicably coupled to said digital sign.

4. The system of claim 1, wherein said controller board further comprises a communication module for establishing communication with an electronic device, wherein said electronic device is communicably connected to said digital sign to control said digital sign remotely.

5. The system of claim 1, wherein said controller board further comprises a proximity sensor configured to detect presence of said oncoming vehicle and trigger said LED panel to adjust said brightness level of said front-facing display of said LED panel when said pilot truck is within said first predetermined distance of said oncoming vehicle.

6. A system for displaying messages, comprising:
   a digital sign comprising a controller board having a microprocessor, a processor, a proximity sensor, a first GPS unit, an LED panel, and a power source, wherein said digital sign is mounted on a pilot truck, further wherein said LED panel comprises a front-facing display visible to an oncoming vehicle and a rear-facing display visible to a transport truck trailing said pilot truck;
   a second GPS unit disposed on said transport truck;
   said proximity sensor configured to detect presence of said oncoming vehicle and trigger said LED panel to adjust a brightness level of said front-facing display of said LED panel when said pilot truck is within a first predetermined distance of said oncoming vehicle and detect presence of said transport truck and trigger said LED panel to adjust a brightness level of said rear-facing display when said pilot truck is within a second predetermined distance of said transport truck;
   said first GPS unit configured to provide a real-time location of said pilot truck and said second GPS unit in communication with said digital sign to provide a real-time location of said transport truck, wherein said real-time location of said pilot truck and said real-time location of said transport truck are used to calculate a distance between said pilot truck and said transport truck, further wherein said brightness level of said rear-facing display is automatically adjusted if said distance is within said second predetermined distance.

7. The system of claim 6, wherein said controller board further comprises a temperature sensor communicably coupled to internal fans, further wherein said temperature sensor is configured to activate said internal fans when said temperature sensor determines that exterior temperature is above or below a predetermined range of temperatures.

8. The system of claim 6, wherein said transport truck comprises a load, further wherein said load comprises one or more sensors communicably coupled to said digital sign.

9. The system of claim 6, wherein said controller board further comprises a communication module for establishing communication with an electronic device, wherein said electronic device is communicably connected to said digital sign.

10. The system of claim 6, wherein said controller board further comprises an ambient light sensor configured to manage said brightness level of said front-facing display of said LED panel when said pilot truck is within said first predetermined distance of said oncoming vehicle.

11. A computerized method for displaying messages, comprising the steps of:
   a) detecting, by at least one sensor of a digital sign, an oncoming vehicle, wherein said digital sign comprises an LED panel having a front-facing display and a rear-facing display;
   b) determining a distance between a pilot truck and said oncoming vehicle, by said at least one sensor;
   c) adjusting a brightness level of said front-facing display of said LED panel disposed on said pilot truck if said distance between said pilot truck and said oncoming vehicle is less than a first predetermined distance;
   d) detecting, by said at least one sensor of said digital sign, a transport truck;
   e) calculating a distance between said pilot truck and said transport truck; and
   f) adjusting a brightness level of said rear-facing display of said LED panel disposed on said pilot truck if said distance between said pilot truck and said transport truck is less than a second predetermined distance.

12. The method of claim 11, wherein said at least one sensor comprises an ambient light sensor;
   said ambient sensor configured to manage said brightness level of said LED panel by measuring surrounding light from said oncoming vehicle.

13. The method of claim 11, wherein said at least one sensor comprises a proximity sensor;
   said proximity sensor configured to detect presence of said oncoming vehicle and trigger said LED panel to adjust said brightness level of said front-facing panel of said LED panel when said pilot truck is within said first predetermined distance of said oncoming vehicle.

14. The method of claim 11, wherein step d further comprises the steps of:
   determining a real-time location of said pilot truck having a first GPS unit; and
   determining a real-time location of said transport truck having a second GPS unit.

* * * * *

UNITED STATES PATENT AND TRADEMARK OFFICE
CERTIFICATE OF CORRECTION

PATENT NO. : 9,734,744 B1
APPLICATION NO. : 15/188134
DATED : August 15, 2017
INVENTOR(S) : McGie It is certified that error appears in the above-identified patent and that said Letters Patent is hereby corrected as shown below:

Please delete Patent No. 9,734,744 B1 in its entirety and insert Patent No. 9,734,744 B1 as shown on the attached pages.

Signed and Sealed this
Twenty-seventh Day of February, 2018

Andrei Iancu
*Director of the United States Patent and Trademark Office*

(12) United States Patent (10) Patent No.: US 9,734,744 B1
McGie (45) Date of Patent: Aug. 15, 2017

(54) SELF-REACTING MESSAGE BOARD

(71) Applicant: Peter McGie, St. Albert (CA)

(72) Inventor: Peter McGie, St. Albert (CA)

(73) Assignees: Joan Mercior, Edmonton, Alberta (CA); John Strutt, Edmonton, Alberta (CA)

( * ) Notice: Subject to any disclaimer, the term of this patent is extended or adjusted under 35 U.S.C. 154(b) by 0 days.

(21) Appl. No.: 15/188,134

(22) Filed: Jun. 21, 2016

Related U.S. Application Data

(60) Provisional application No. 62/328,251, filed on Apr. 27, 2016.

(51) Int. Cl.
*B60Q 1/00* (2006.01)
*B60Q 1/50* (2006.01)
(Continued)

(52) U.S. Cl.
CPC ............ *G09G 3/14* (2013.01); *B60Q 1/26* (2013.01); *B60Q 1/2611* (2013.01); *B60Q 9/006* (2013.01); *B60Q 9/007* (2013.01); *B60Q 9/008* (2013.01); *G01S 19/01* (2013.01); *G08G 1/0965* (2013.01); *G08G 1/096741* (2013.01); *G09F 13/22* (2013.01); *G09F 21/04* (2013.01); *G09F 21/048* (2013.01); *B60Q 1/50* (2013.01); *B60Q 1/503* (2013.01); *B60Q 2900/30* (2013.01); *G01S 13/87* (2013.01); *G01S 13/931* (2013.01);
(Continued)

(58) Field of Classification Search
CPC .............. G01S 13/87; G01S 13/931; G01S 2013/9325; G01S 2013/936; G01S 15/931; G08G 1/0965; G08G 1/096741; G08G 2380/06; G09F 21/04; G09F 21/048; B60Q 1/26; B60Q 1/2611; B60Q 1/50; B60Q 1/503; B60Q 2900/30; B60Q 9/006; B60Q 9/007; B60Q 9/008
See application file for complete search history.

(56) References Cited

U.S. PATENT DOCUMENTS 5,087,918 A * 2/1992 May ............... G01S 13/931
340/435
5,162,696 A * 11/1992 Goodrich ............ G09F 9/33
257/E25.02
(Continued)

*Primary Examiner* — Michael J Eurice

(57) ABSTRACT

Disclosed is a digital sign system and method of use thereof. The system includes a digital sign having a controller board having a microcontroller, a temperature sensor communicably coupled to fans or a cooling/heating unit, an ambient light sensor, a GPS unit, a radar, a communication module, and a power source, wherein the controller board is in communication with an LED panel or another display module for digitally outputting messages, further wherein the digital sign is mounted on a pilot truck to allow the pilot truck to relay messages to a transport truck and oncoming vehicles. The digital sign is in communication with a second GPS unit disposed on the transport truck so as to track the real-time location of the truck. The digital sign measures the distance between a transport and the digital pilot truck sign and displays the relative distances between the two on the digital message board. In operation, the digital sign is configured to automatically adjust its brightness so as to optimize its visibility while reducing glare to other drivers on the road.

14 Claims, 5 Drawing Sheets

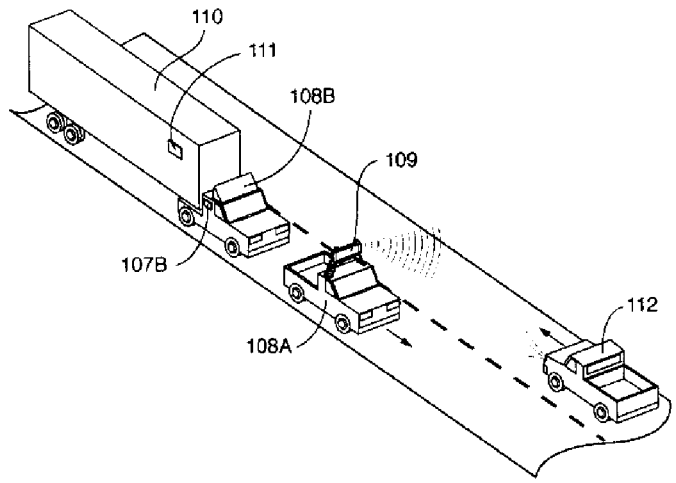

(51) Int. Cl.

| | |
|---|---|
| *B60Q 1/26* | (2006.01) |
| *G09G 3/14* | (2006.01) |
| *G09F 13/22* | (2006.01) |
| *G09F 21/04* | (2006.01) |
| *G01S 19/01* | (2010.01) |
| *B60Q 9/00* | (2006.01) |
| *G08G 1/0967* | (2006.01) |
| *G08G 1/0965* | (2006.01) |
| *G01S 15/93* | (2006.01) |
| *G01S 13/93* | (2006.01) |
| *G01S 13/87* | (2006.01) |

(52) U.S. Cl.
CPC ....... *G01S 15/931* (2013.01); *G01S 2013/936* (2013.01); *G01S 2013/9325* (2013.01); *G09F 2013/222* (2013.01); *G09G 2320/0626* (2013.01); *G09G 2354/00* (2013.01); *G09G 2360/144* (2013.01); *G09G 2380/06* (2013.01); *G09G 2380/10* (2013.01)

(56) References Cited

U.S. PATENT DOCUMENTS

| | | | | |
|---|---|---|---|---|
| 6,058,718 | A * | 5/2000 | Forsberg | C02F 9/005 62/125 |
| 6,505,774 | B1 * | 1/2003 | Fulcher | G06Q 30/0284 235/379 |
| 6,894,608 | B1 * | 5/2005 | Gunderson | B60Q 1/525 340/425.5 |
| 7,696,865 | B1 * | 4/2010 | Robinson | B60Q 1/503 340/472 |
| 7,826,945 | B2 | 11/2010 | Zhang | |
| 2002/0005778 | A1 * | 1/2002 | Breed | B60Q 9/008 340/435 |
| 2002/0105432 | A1 * | 8/2002 | Pederson | B60Q 1/2611 340/815.45 |
| 2002/0133285 | A1 * | 9/2002 | Hirasago | B60K 31/0008 701/96 |
| 2003/0034934 | A1 * | 2/2003 | Brewer | B60Q 1/503 345/1.1 |
| 2004/0105264 | A1 * | 6/2004 | Spero | B60Q 1/04 362/276 |
| 2004/0201483 | A1 * | 10/2004 | Stam | B60Q 1/1423 340/600 |
| 2006/0026017 | A1 * | 2/2006 | Walker | H04L 63/302 701/31.4 |
| 2006/0059745 | A1 * | 3/2006 | Maqui | G09F 21/04 40/591 |
| 2007/0005206 | A1 * | 1/2007 | Zhang | G06F 3/16 701/36 |
| 2007/0256339 | A1 * | 11/2007 | Fryer | G01J 1/4204 40/442 |
| 2008/0220760 | A1 | 9/2008 | Ullah | |
| 2008/0236007 | A1 * | 10/2008 | Au | B60Q 1/2611 40/592 |
| 2008/0290803 | A1 * | 11/2008 | Santo | G09G 3/3413 315/151 |
| 2008/0316153 | A1 * | 12/2008 | Yuen | G09F 9/33 345/82 |
| 2009/0150242 | A1 * | 6/2009 | Del Cogliano | G06Q 30/0265 705/14.62 |
| 2010/0253493 | A1 * | 10/2010 | Szczerba | G01S 13/723 340/435 |
| 2010/0253539 | A1 * | 10/2010 | Seder | G01S 13/723 340/903 |
| 2011/0013109 | A1 * | 1/2011 | Bryan | G09F 7/12 349/58 |
| 2011/0067059 | A1 | 3/2011 | Johnston | |
| 2011/0069050 | A1 * | 3/2011 | Sirmon | G09F 9/33 345/207 |
| 2011/0080421 | A1 * | 4/2011 | Capener | G09G 5/10 345/589 |
| 2011/0106329 | A1 * | 5/2011 | Donnelly | B60L 3/12 700/291 |
| 2011/0130915 | A1 * | 6/2011 | Wright | G01M 17/007 701/29.6 |
| 2011/0199254 | A1 * | 8/2011 | Bishop | G01S 13/89 342/179 |
| 2012/0013459 | A1 * | 1/2012 | Giangrande | B60Q 1/44 340/468 |
| 2012/0025964 | A1 * | 2/2012 | Beggs | B60Q 1/2673 340/435 |
| 2012/0062743 | A1 * | 3/2012 | Lynam | B60Q 9/005 348/148 |
| 2012/0303458 | A1 * | 11/2012 | Schuler, Jr. | G09F 27/005 705/14.63 |
| 2013/0258044 | A1 * | 10/2013 | Betts-Lacroix | H04N 13/0242 348/36 |
| 2013/0258688 | A1 * | 10/2013 | Kalapodas | B60Q 1/085 362/465 |
| 2014/0149216 | A1 * | 5/2014 | McGie | G06Q 30/0257 705/14.55 |
| 2014/0159993 | A1 * | 6/2014 | McGie | G06F 3/1438 345/2.3 |
| 2014/0210646 | A1 * | 7/2014 | Subramanya | B61L 29/28 340/928 |
| 2014/0304080 | A1 * | 10/2014 | Yilmaz | G09F 21/04 705/14.63 |
| 2014/0338237 | A1 * | 11/2014 | Chu | G09F 9/30 40/452 |
| 2015/0061895 | A1 * | 3/2015 | Ricci | H04W 4/22 340/902 |
| 2015/0120089 | A1 * | 4/2015 | Peel | B60T 7/16 701/2 |
| 2015/0276187 | A1 * | 10/2015 | Shoemake | F21V 21/00 362/235 |
| 2016/0231746 | A1 * | 8/2016 | Hazelton | G05D 1/0212 |

* cited by examiner

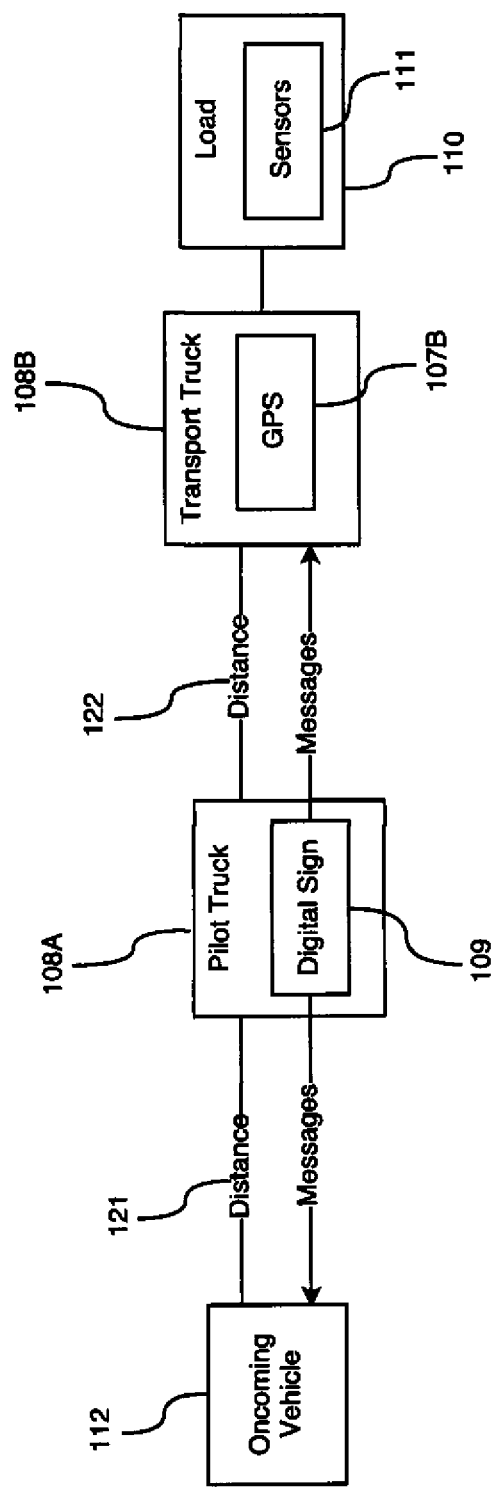

SELF-REACTING MESSAGE BOARD

CROSS-REFERENCE TO RELATED APPLICATIONS

This application claims the benefit of U.S. Provisional Patent Application No. 62/328,251, filed Apr. 27, 2016, which is hereby incorporated by reference in its entirety.

FIELD OF THE INVENTION

The present invention relates generally to digital message boards. More particularly, the present invention is directed to message board systems for pilot freight services.

BACKGROUND OF THE INVENTION

Pilot trucks for freight services typically comprise signs for warning the oncoming traffic of an oversize load trailing a pilot truck. Some of the existing signs comprise simple banners, but these banners are difficult to see in the dark or in inclement weather. Other existing signs comprise digital signs (i.e., with illumination means). Conventional digital signs for pilot trucks are generally visible from approximately 45 meters away, although the visibility can be greatly increased when the brightness setting of these digital signs is at its maximum setting. However, the brightness of the sign can cause glare or distraction, which can be dangerously blinding to the drivers of the oncoming traffic and cause traffic accidents. In this regard, the invention described herein addresses this problem.

SUMMARY OF THE INVENTION

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as to prelude to the more detailed description that is disclosed later.

Some embodiments of the present invention include, for example, devices, systems, and methods of providing a digital message board that automatically reacts to the oncoming traffic in order to increase visibility of warning messages and traffic signs while reducing glare and distractions on the road.

Some embodiments of the present system include a system including a digital sign comprising a controller board having a microcontroller, a temperature sensor communicably coupled to fans or a cooling/heating unit, an ambient light sensor, a GPS unit, a radar, a communication module, and a power source, wherein the controller board is in communication with an LED panel or another display module for digitally outputting messages, further wherein the digital sign is mounted on a pilot truck to allow the pilot truck to relay messages to a transport truck and oncoming vehicles on the road.

Some embodiments of the digital sign are operated via an electronic device (e.g., a computer system), which is communicably coupled thereto via wireless means. The electronic device comprises a memory unit having instructions stored thereon, wherein the instructions can be executed via a processing unit, causing the electronic device to operate the digital sign, for example, in order to upload messages to be displayed on the LED panel, to control brightness settings, and the like.

Additionally, the system comprises a load that is carried by the transport truck, the load further comprising one or more sensors that is communicably coupled to the digital sign and/or the electronic device. Without limitation, the sensors may comprise various environmental sensors such as a GPS unit, a temperature sensor, a light sensor, a still photo or video camera, an audio sensor (e.g., a microphone), a velocity sensor, a gyroscope, an accelerometer, a speed sensor, and a compass, depending upon embodiment. The sensors may be removably attached to the load such that one sensor can be re-used with multiple loads and the sensors can be retroactively fitted to various types of loads.

Each of the pilot truck and the transport truck comprises a GPS unit for providing accurate, real-time location of each of the vehicles. The real-time location of the vehicles can be used for determining the brightness of the LED panel when the pilot truck is relaying messages via the LED panel to the transport truck. Additionally, the real-time location of the vehicles can be used to calculate the distance between the pilot truck and the transport truck to warn the oncoming traffic of how far away the transport truck is.

The LED panel of the pilot truck is further configured to transmit messages to vehicles of the oncoming traffic. Without limitation, the pilot truck can warn the oncoming vehicles of a trailing oversize load, a wide load, and an emergency vehicle, among other types of messages. The brightness of the LED panel can be automatically adjusted depending on the distance of the oncoming vehicles to prevent the LED panel from blinding the drivers of the oncoming vehicles, while providing sufficient brightness to the oncoming vehicles in the distance.

BRIEF DESCRIPTION OF THE DRAWINGS

The above and other objects and advantages of the present invention will be apparent upon consideration of the following detailed description, taken in conjunction with the accompanying exemplary drawings, in which like reference characters refer to like parts throughout, and in which:

FIG. 1 depicts a diagram of the present system in operation.

FIG. 2 depicts a high-level block diagram of the present system in accordance with some embodiments of the present invention.

FIG. 3 depicts a detailed diagram of the controller of the present system.

FIGS. 4A and 4B show exemplary method steps of the present invention.

DETAILED DESCRIPTION OF THE INVENTION

The present invention is directed towards an automatic digital sign system and a method of use thereof. For purposes of clarity, and not by way of limitation, illustrative views of the present system and method are described with references made to the above-identified figures. Various modifications obvious to one skilled in the art are deemed to be within the spirit and scope of the present invention.

As used in this application, the terms "component," "module," "system," "interface," or the like are generally intended to refer to a computer-related entity, either hardware or a combination of hardware and software. For example, a component can be, but is not limited to being, a process running on a processor, an object, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

It is to be appreciated that determinations or inferences referenced throughout the subject specification can be practiced through the use of artificial intelligence techniques. In this regard, some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Discussions herein utilizing terms such as, for example, "processing," "computing," "calculating," "determining," "establishing," "identifying," "analyzing," "checking," or the like, may refer to operations(s) and/or process(es) of a computer, a computing platform, a computing system, or other electronic computing device, that manipulate and/or transfer data represented as physical (e.g., electronic) quantities within the computer's registers and/or memories into other data similarly represented as physical quantities within the computer's registers and/or memories or other information storage medium that may store instructions to perform operations and/or processes.

Some embodiments of the present invention may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a personal computer (PC), a desktop computer, a mobile computer, a laptop, a tablet computer, a server computer, a handheld device, a personal digital assistant (PDA), a wireless communication device, a smart phone, a non-portable device, a wireless access point (AP), a wired or wireless router, a wired or wireless modem, a wired or wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), or networks operating in accordance with existing and/or future versions and/or derivatives of long term evolution (LTE), a device which incorporates a global positioning system (GPS) receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, or the like.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or." Additionally, the articles "a" and "an" as used in this application and the appended claims should generally be construed to mean "one or more" or "at least one" unless specified otherwise or clear from context to be directed to a singular form.

Referring now to FIGS. 1 through 3, there are shown various block diagrams of the present system. Some embodiments of the present system include a digital sign 109 comprising a first GPS unit 107A, wherein the digital sign 109 is in communication with a second GPS unit 107B and/or one or more sensors 111, further wherein the digital sign 109 is mounted on a pilot truck 108A, the second GPS unit 107B is mounted on a transport truck 108B, and the sensors 111 are mounted on a load 110 that is hauled by the transport truck 108B.

The digital sign 109 comprises a controller board 103, which includes a microcontroller (MCU) 114 or another suitable processing/controller unit that is communicably coupled to a temperature sensor 105, an ambient light sensor 104, a first GPS unit 107A, a radar/proximity sensor 106, a communication module 116, and a power source 115 (e.g., batteries), wherein the MCU 114 is also electrically connected to an LED panel 102 or another display unit for displaying messages digitally. It is contemplated that the digital sign 109 comprises a housing member with a defined interior volume for enclosing the foregoing elements therein, while allowing the LED panel 102 to be visible from the exterior of the housing member.

The LED panel 102 of the pilot truck 108A may comprise a front-facing display 102A and a rear-facing 102B display so that the panel 102 can display different messages to the oncoming vehicles 112 and the transport truck 108B, respectively. For example, the front-facing display 102A can warn the oncoming vehicle 112 of a wide load, and the rear-facing display 102B can warn the transport truck 108B of, for example, the road conditions ahead. Alternatively, both the front-facing display 102A and the rear-facing display 102B can be configured to display the same or different texts, pictures, numbers, symbols, or the like.

The temperature sensor 105 is further connected to internal fans 101 disposed in the interior volume of the housing, wherein the fans 101 are configured to automatically activate, via the MCU 114, when the temperature sensor 105 detects that the temperature is below a predetermined threshold. In this way, the fans 101 can blow hot air through perforations disposed on the housing member to warm up, for example, the Lexan™ that is covering the viewing surface of the LED panel 102 and melt any ice or snow that has accumulated. Alternatively, the fans 101 may be configured to automatically activate to cool the interior of the sign 109 to prevent overheating when the temperature is above a predetermined threshold. In some embodiments, the fans 101 can comprise heating and/or cooling units.

It is contemplated that the fans 101 are also configured to automatically deactivate when the temperature is within a predetermined range of temperatures, for example, at ambient temperatures or at ideal temperatures. The predetermined temperatures noted herein may be pre-programmed (i.e., based on factory settings) or adjustable (i.e., based on consumer- or user-established preferences) via another electronic device 113 (e.g., a computer, a smart phone).

Some embodiments of the present system further comprise a radar/proximity sensor 106, wherein the radar/proximity sensor 106 is configured to detect an oncoming vehicle 112 and trigger the LED panel 102 to dim when the oncoming vehicle 112 is within a predetermined distance 121 of the front (i.e., the traveling direction) of the pilot truck 108A. As used herein, the "predetermined distance" is a distance that would not cause glare for other drivers.

The radar/proximity sensor 106 is further configured to determine whether the oncoming vehicle 112 has passed the pilot truck 108A, or is no longer in the traveling direction of the pilot truck 108A. In this way, the radar/proximity sensor 106 can trigger the LED panel 102 to return to its starting brightness setting when the oncoming vehicle 112 is no longer within the predetermined distance 121 of the front of the pilot truck 108A.

The radar/proximity sensor 106 can be used in conjunction with the ambient light sensors 104. The ambient light sensors 104 are configured to approximate the human eye response to light under a variety of lighting conditions and lighting environments (e.g., from low-light to bright sunlight). In this way, the ambient light sensors 104 are configured to manage or control the brightness of the LED panel 102 when an oncoming vehicle 112 is approaching. More specifically, the ambient light sensors 104 can trigger the LED panel 102 to dim or adjust brightness when the radar/proximity sensor 106 determines that an oncoming vehicle 112 is within a predetermined distance 121 of the pilot truck 108A (i.e., in the pilot truck's 108A traveling direction) to prevent blinding the driver of the oncoming vehicle 112. When the oncoming vehicle 112 has passed the pilot truck 108A, the ambient light sensors 104 are configured to trigger the LED panel 102 to return to its original brightness to allow other drivers in the oncoming traffic to easily view the sign from a long distance.

Some embodiments of the system further comprise the communication module 116, wherein the communication module 116 is configured to establish wireless communication between the digital sign 109 and at least one input terminal, such as a remote electronic device (e.g., a computer system 113). It is noted that the electronic device comprises various types of computer systems 113, including a smart phone, a tablet computer, a laptop, a desktop computer, a personal digital assistant (PDA), an e-reader, and the like.

The computer system 113 comprises a memory unit 117 having instructions 118 stored thereon, wherein the instructions 118 can be executed by a processor 119, causing the computer system 113 to operate the digital sign 109, for example, to upload and update messages to be displayed on the LED panel, to control brightness settings, to set predetermined temperatures, to set predetermined distance ranges, and the like, for example, via a user interface 120. It is contemplated that the computer system 113 and the digital sign 109 are configured to pair with each other. In some embodiments, one computer system 113 can be paired with a plurality of digital signs 109.

The present system further includes a transport truck 108B comprising a second GPS unit 107B, which is in communication with the digital sign 109. The transport truck 108B further comprises a load 110 being transported thereon. The load 110 comprises one or more sensors 111 thereon, wherein the sensors 111 comprise temperature sensor, ambient light sensor, and other types of sensors. For instance, sensors 111 may further comprise various types of environmental sensors such as a GPS unit, a still photo or video camera, an audio sensor (e.g., a microphone), a velocity sensor, a gyroscope, an accelerometer, a speed sensor, and a compass, depending upon embodiment. The sensors 111 are communicably coupled to the digital sign 109 and/or the computer system 113 so as to inform one or more users of the status of the load 110.

The GPS unit 107A, 107B can be used for providing accurate, real-time location of each of the vehicles (i.e., the pilot truck 108A and the transport truck 108B) while on the road. For instance, the location of the pilot truck 108A is communicated to the transport truck 108B, and the location of the transport truck 108B is communicated to the pilot truck 108A. The locations of the vehicles are used for determining the required brightness of the LED panel 102 when the panel 102 is used to relay messages from the pilot truck 108A to the transport truck 108B. More specifically, the locations of the vehicles are used to calculate the distance 122 between the pilot truck 108A and the transport truck 108B; and if the distance 122 is less than a predetermined distance, then the LED panel 102 (i.e., the rear-facing display 102B) is configured to dim or adjust in brightness, for example, as specified by the ambient light sensor 104.

Additionally, the calculated distance 122 between the pilot truck 108A and the transport truck 108B can be displayed on the LED panel 102 (i.e., the front-facing display 102A) to inform the oncoming traffic of the distance 122 of the transport truck 108B trailing behind the pilot truck 108A. Moreover, the real-time location of the vehicles can be used to inform the driver of the vehicles of the whereabouts of each vehicle.

Reference is now made to FIGS. 4A and 4B, which shows exemplary method steps of the present invention in operation. In some embodiments, one or more operations of FIGS. 4A and 4B may be performed by one or more elements of the present system as depicted in FIGS. 1 through 3, for example, the controller board 103 (FIG. 3) and the LED panel 102 (FIG. 3), among other components.

To start 401, the digital sign 109 is activated and optionally mounted on a pilot truck 108A (FIG. 1). As indicated in block 402, the present method comprises the step of determining whether the exterior temperature is below or above threshold via the temperature sensor 105 (FIG. 3). If the measured temperature is below or above a predetermined range of temperatures or threshold, the temperature sensor 105 (FIG. 3) triggers the fans 101 (FIG. 3) to activate via the MCU 114 (FIG. 3), as indicated in block 403. It is contemplated that the temperature sensor 105 (FIG. 3) is configured to continuously measure the temperature so as to automatically deactivate the fans 101 (FIG. 3) via the MCU 114 (FIG. 3) when the temperature is within the predetermined range of temperatures.

As indicated in block 404, the radar/proximity sensor 106 (FIG. 3) determines whether an oncoming vehicle 112 (FIG. 1) (i.e., traveling in the opposite direction as the pilot truck 108A (FIG. 1) and the transport truck 108B (FIG. 1)) is within a predetermined distance 121 (FIG. 2) away from the pilot truck 108A (FIG. 1). If the oncoming vehicle is within a predetermined distance 121 (FIG. 2) of the pilot truck 108A (FIG. 1), the ambient light sensor 104 (FIG. 3) measures the surrounding light to determine the appropriate brightness level of the front-facing display 102A (FIG. 3) of the LED panel 102 (FIG. 3), as indicated in block 405. In one embodiment, the brightness level of the front-facing display 102A (FIG. 3) of the LED panel 102 (FIG. 3) is reduced, dimmed, or otherwise adjusted 406. In this way, the brightness setting of the LED panel 102 (FIG. 3) is managed or controlled by the ambient light sensor 104 (FIG. 3).

If the oncoming vehicle 112 (FIG. 1) is not within a predetermined distance 121 (FIG. 2) or if the oncoming vehicle 112 is no longer in front of the pilot truck 108A (FIG. 1), the brightness level of the LED panel 102 (FIG. 3) is maintained or increased back to the original or starting brightness level. It is contemplated that in some embodiments, the brightness level can be automatically adjusted via the ambient light sensor 104 (FIG. 3) based on the amount light detected even when there is no oncoming vehicle 112 (FIG. 1).

As indicated in block 407, the digital sign 109 (FIG. 3) can display messages, via the front-facing display 102A (FIG. 3) of the LED panel 102 (FIG. 3), to oncoming vehicles. If a user wishes to transmit a message, the message may be manually input via a separate user device 113 (FIG. 3) (e.g., a handheld electronic device, mobile phone, tablet computer, etc.) and transmitted. Alternatively, the user can select a message from a list of preloaded messages and then transmit the message 408. In some embodiments, the user can program the MCU 114 (FIG. 3) so as to display certain messages at specific times or alternate multiple messages. In this regard, the MCU 114 (FIG. 3) may be configured to store one or more messages therein.

As indicated in block 409, the transport truck 108B (FIG. 1) is located via the second GPS unit 107B (FIG. 3). The real-time location of the transport truck 108B (FIG. 1) is used to calculate the distance 122 (FIG. 2) between the pilot truck 108A (FIG. 1) and the transport truck 108B (FIG. 1), as indicated in block 410. If the transport truck 108B (FIG. 1) is within a predetermined distance 122 (FIG. 2) away from the pilot truck 108A (FIG. 1), as indicated in block 411, the brightness level of the rear-facing display 102B (FIG. 3) of the LED panel 102 (FIG. 3) is adjusted. Optionally, the ambient light sensor 104 (FIG. 3) can measure the surrounding light to determine the appropriate brightness level of the rear-facing display 102B (FIG. 3) of the LED panel 102 (FIG. 3), as indicated in block 412.

As indicated in block 414, the digital sign 109 (FIG. 3) of the pilot truck 108A (FIG. 1) can display messages, via the rear-facing display 102B (FIG. 3) of the LED panel 102 (FIG. 3) to the transport truck 108B (FIG. 1). As described above, the message may be manually input via a separate user device 113 (FIG. 3) (e.g., a handheld electronic device, mobile phone, tablet computer, etc.) and transmitted. Alternatively, the user can select a message from a list of preloaded messages and then transmit the message 415.

As indicated in block 416, the GPS location of the pilot truck 108A (FIG. 1) and the transport truck 108B (FIG. 1) can be used to determine whether the vehicles have reached the destination. When the vehicles have reached the destination, the digital sign 109 (FIG. 3) can automatically terminate operation 417.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A system for displaying messages, comprising:
a digital sign comprising a controller board having a microprocessor, a processor, a light sensor, an LED panel, and a power source, wherein said digital sign is mounted on a pilot truck, further wherein said LED panel comprises a front-facing display visible to an oncoming vehicle and a rear-facing display visible to a transport truck trailing said pilot truck;
said light sensor configured to measure surrounding light and adjust a brightness level of said front-facing display of said LED panel when said pilot truck is within a first predetermined distance of said oncoming vehicle and adjust a brightness level of said rear-facing display of said LED panel when said pilot truck is within a second predetermined distance of a vehicle trailing said pilot truck.

2. The system of claim 1, wherein said controller board further comprises a temperature sensor communicably coupled to internal fans, further wherein said temperature sensor is configured to activate said internal fans when said temperature sensor determines that exterior temperature is above or below a predetermined range of temperatures.

3. The system of claim 1, wherein said transport truck comprises a load, further wherein said load comprises one or more sensors communicably coupled to said digital sign.

4. The system of claim 1, wherein said controller board further comprises a communication module for establishing communication with an electronic device, wherein said electronic device is communicably connected to said digital sign to control said digital sign remotely.

5. The system of claim 1, wherein said controller board further comprises a proximity sensor configured to detect presence of said oncoming vehicle and trigger said LED panel to adjust said brightness level of said front-facing display of said LED panel when said pilot truck is within said first predetermined distance of said oncoming vehicle.

6. A system for displaying messages, comprising:
a digital sign comprising a controller board having a microprocessor, a processor, a proximity sensor, a first GPS unit, an LED panel, and a power source, wherein said digital sign is mounted on a pilot truck, further wherein said LED panel comprises a front-facing display visible to an oncoming vehicle and a rear-facing display visible to a transport truck trailing said pilot truck;
a second GPS unit disposed on said transport truck;
said proximity sensor configured to detect presence of said oncoming vehicle and trigger said LED panel to adjust a brightness level of said front-facing display of said LED panel when said pilot truck is within a first predetermined distance of said oncoming vehicle and detect presence of said transport truck and trigger said LED panel to adjust a brightness level of said rear-facing display when said pilot truck is within a second predetermined distance of said transport truck;
said first GPS unit configured to provide a real-time location of said pilot truck and said second GPS unit in communication with said digital sign to provide a real-time location of said transport truck, wherein said real-time location of said pilot truck and said real-time location of said transport truck are used to calculate a relative distance between said pilot truck and said transport truck, further wherein said relative distance is displayed on the front-facing display.

7. The system of claim 6, wherein said controller board further comprises a temperature sensor communicably coupled to internal fans, further wherein said temperature sensor is configured to activate said internal fans when said temperature sensor determines that exterior temperature is above or below a predetermined range of temperatures.

8. The system of claim 6, wherein said transport truck comprises a load, further wherein said load comprises one or more sensors communicably coupled to said digital sign.

9. The system of claim 6, wherein said controller board further comprises a communication module for establishing communication with an electronic device, wherein said electronic device is communicably connected to said digital sign.

10. The system of claim 6, wherein said controller board further comprises a light sensor configured to manage said brightness level of said front-facing display of said LED panel when said pilot truck is within said first predetermined distance of said oncoming vehicle.

11. A computerized method for displaying messages, comprising the steps of:
a) detecting, by at least one sensor of a digital sign, an oncoming vehicle, wherein said digital sign comprises an LED panel having a front-facing display and a rear-facing display;
b) determining a distance between a pilot truck and said oncoming vehicle, by said at least one sensor;
c) adjusting a brightness level of said front-facing display of said LED panel disposed on said pilot truck if said distance between said pilot truck and said oncoming vehicle is less than a first predetermined distance;
d) detecting, by said at least one sensor of said digital sign, a transport truck;
e) calculating a distance between said pilot truck and said transport truck; and
f) adjusting a brightness level of said rear-facing display of said LED panel disposed on said pilot truck if said distance between said pilot truck and said transport truck is less than a second predetermined distance.

12. The method of claim 11, wherein said at least one sensor comprises a light sensor;
said light sensor configured to manage said brightness level of said LED panel by measuring surrounding light from said oncoming vehicle.

13. The method of claim 11, wherein said at least one sensor comprises a proximity sensor;
said proximity sensor configured to detect presence of said oncoming vehicle and trigger said LED panel to adjust said brightness level of said front-facing display of said LED panel when said pilot truck is within said first predetermined distance of said oncoming vehicle.

14. The method of claim 11, wherein step d further comprises the steps of:
determining a real-time location of said pilot truck having a first GPS unit; and
determining a real-time location of said transport truck having a second GPS unit.

* * * * *